May 28, 1968

KYUNG HO HYUN 3,385,988

MULTI-PLATE IONISATION CHAMBER WITH GAMMA-COMPENSATION
AND GUARD-RING ELECTRODES

Filed Aug. 10, 1964

United States Patent Office 3,385,988
Patented May 28, 1968

1

3,385,988
MULTI-PLATE IONISATION CHAMBER WITH GAMMA-COMPENSATION AND GUARD-RING ELECTRODES
Kyung Ho Hyun, Whetstone, England, assignor to The English Electric Company Limited, London, England, a British company
Filed Aug. 10, 1964, Ser. No. 388,598
Claims priority, application Great Britain, Aug. 23, 1963, 33,410/63
3 Claims. (Cl. 313—61)

This invention relates to ionisation chambers for detecting nuclear radiation, including neutron flux or gamma-radiation or both.

According to the invention, such a chamber includes an enclosed vessel within which a plurality of polarising plate electrodes are arranged parallel to and alternately with a plurality of collector plate electrodes, all the collector plate electrodes being electrically-connected together, at least one side of each collector plate electrode being coated with a neutron-sensitive material and the vessel being arranged to contain an ionisable gas, means for connecting the polarising plate electrodes to a voltage source so that when a voltage is applied to the chamber from said source in the presence of externally-applied nuclear radiation, a current dependent on the intensity of said radiation is caused to flow in said gas and through the electrodes, and means for collecting said current from the collector plate electrodes for transmission away from the chamber as an output signal.

According to a preferred feature of the invention, at least the said collector plate electrodes are each provided with a co-planar electrically-conducting peripheral plate member encircing the corresponding collector plate electrode and insulated therefrom.

According to a further preferred feature of the invention, each alternate polarising plate electrode is arranged for electrical connection to one pole of said voltage source and the remainder of the polarising plate electrodes are arranged for electrical connection to the other pole thereof, each collector plate electrode being coated with neutron-sensitive material on one side thereof only.

An ionisation chamber in a preferred form according to the invention, for use in detecting neutron flux in a nuclear reactor, will now be described by way of example and with reference to the accompanying drawings, of which:

Figure 1:
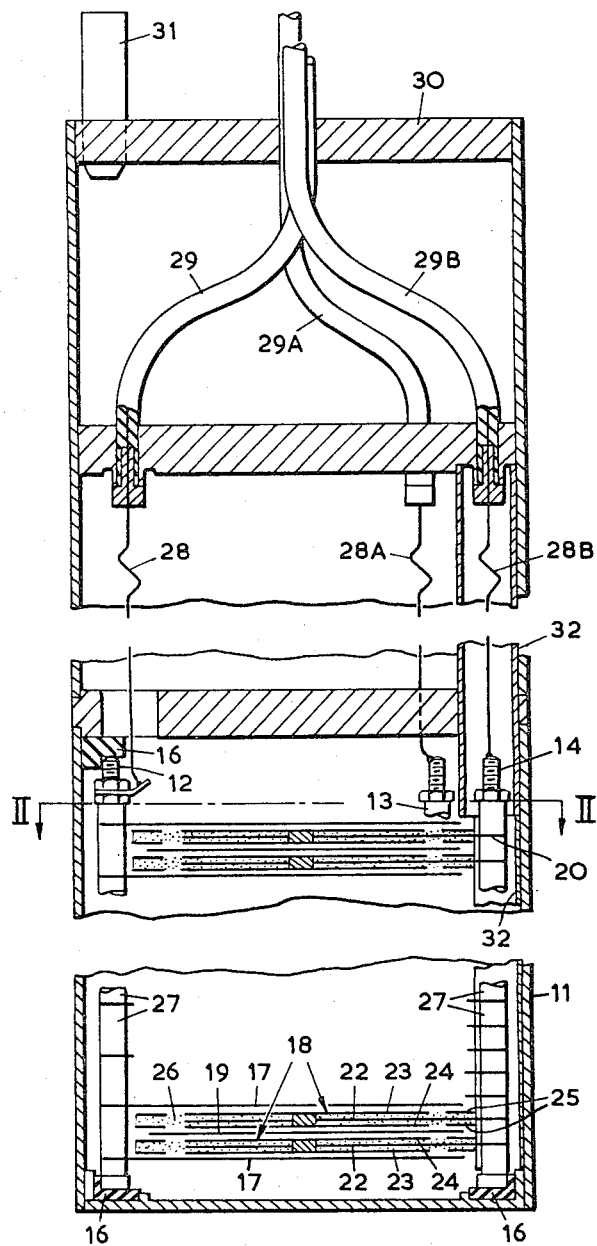
FIG. 1 is a sectional elevation of the ionisation chamber, taken on the line I—I of FIG. 2.
Figure 2:
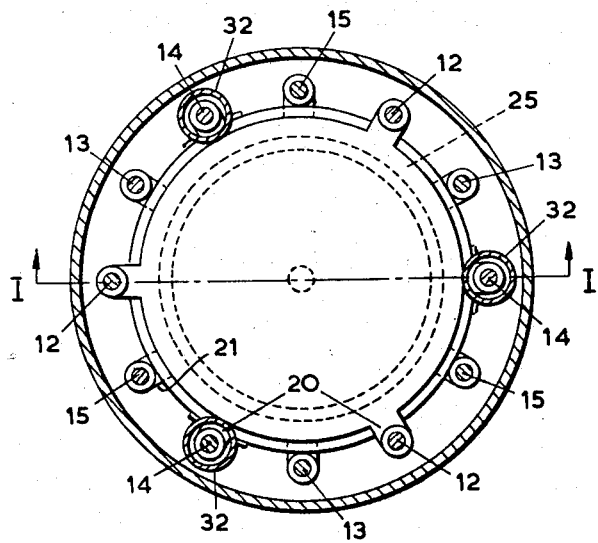
FIG. 2 is a sectional plan taken on the line II—II of FIG. 1.

The ionisation chamber is located in the reactor, within the reactor pressure vessel, which may be of concrete and which contains the moderator and fuel of the reactor. The reactor itself (comprising the pressure vessel, moderator core, fuel and so on) is not shown in the drawings. The purpose of the ionisation chamber is to detect the local neutron flux and to transmit an electrical output signal, responsive to this flux, to indicating or other equipment situated outside the pressure vessel and forming part of the system.

The ionisation chamber comprises a sealed cylindrical vessel 11, made of a material having an acceptably low neutron capture cross-section, and in which twelve equally-spaced longitudinal electrically-conducting pillars 12, 13, 14, 15 are mounted; the pillars are insulated from the vessel 11 by insulators 16. In the body are mounted a number of circular flat plate electrodes 17, 18, 19, each of which has three equally-spaced radially-projecting lugs 20. Each lug 20 has a hole 21 through which one or other of the pillars passes: the lugs are in electrical connection with the respective pillars. The plates are arranged in groups, each of which comprises (in this order reading from one end of the chamber) a positive polarising plate electrode 17; a collector plate electrode generally indicated at 18; a negative polarising plate electrode 19; and a further collector plate electrode 18. The distances between adjacent electrodes are all equal. In this example there are 25 such groups mounted one above the other, although for convenience only two complete groups are actually shown in FIG. 1. All the positive electrodes 17 are carried by the three pillars 12 and all the negative electrodes by the three pillars 13.

Each collector plate electrode 18 (shown more fully in FIG. 3) comprises a central plate 22 carrying the lugs 20 mentioned above and mounted on the three pillars 14, and collector plates 23 and 24, of the same diameter as, and fixed parallel to, and on either side of, the plate 22. The plates 22, 23, 24 are all connected together electrically for example by a central conducting boss 18A (FIG. 3); and the side of the plate 23 nearest the positive electrode 17 is coated with neutron-sensitive material. Two guard-ring electrodes 25, comprising electrically-conducting peripheral plate members concentric with the plates 23 and 24 respectively and encircling them, are mounted on the three pillars 15, which are earthed (by means not shown). The space between the two guard ring electrodes 25, and between the three plates 22, 23, 24, is filled with an insulating layer 26 of a alumina.

Spacer bushes 27 are provided between the lugs 20 of adjacent electrodes on each pillar. Three electrical conductors 28, 28A and 28B lead from the upper ends (as seen in FIG. 1) of one of each of the pillars 12, 13 and 14 respectively to three cables 29, 29A and 29B which pass out through the top end 30 of the chamber body. The cables 29 and 29A are connected to the positive and negative poles respectively of a source (not shown) of polarising voltage. The cable 29B is an output cable for carrying an electrical signal to the indicating or other equipment previously mentioned, which is not shown but which includes an amplifier for amplifying the electrical signals from the ionisation chamber.

The pillars 14, carrying the collector plate electrodes 18, and the associated conductor 28B, are electrically screened by encircling metal screens 32. The cable 29B connected with the screened conductor 28B is itself also screened. The vessel 11 is filled with helium through a gas-filling tube 31 in the top end 30 of the chamber.

In operation, when the reactor is working, a polarising voltage is applied between the positive electrodes 17 and collector electrodes 18, and between the collector electrodes and the negative electrodes 19. Neutrons from the space in the reactor surrounding the ionisation chamber pass through the vessel 11. Any gamma-radiation present also penetrates the body of the chamber. On bombardment by these neutrons, the neutron-sensitive material with which the plates 23 on one side of the collector electrodes 18 are coated produces high-energy charged particles, which ionise the helium in the chamber. An ionisation current therefore flows from each collector electrode 18 to the corresponding positive electrode 17, this current being proportional to the degree of ionisation of the helium and therefore to the neutron flux.

Figure 3:
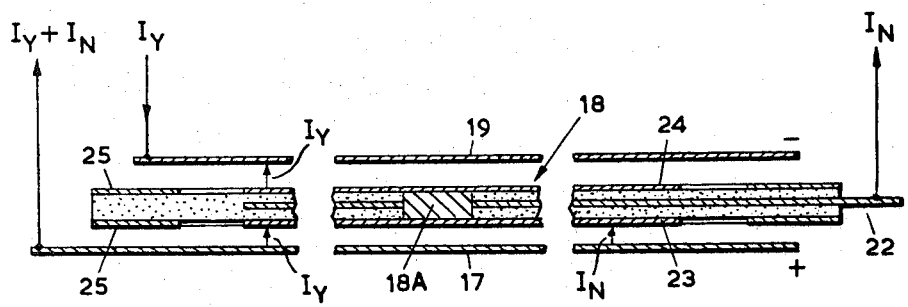
FIG. 3 is an enlarged view of a portion of FIG. 1, showing one group of electrodes in the ionisation chamber shown in FIGS. 1 and 2, and showing diagrammatically the current flow in the electrodes when the ionisation chamber is operating in the reactor.

The gas in the spaces between each collector electrode 18 and its corresponding negative electrode 19 becomes ionised due to gamma-radiation. Now, if $I_N$ and $I_\gamma$ represent the ionisation currents flowing due to neutron flux and gamma-radiation respectively, the current flowing through each negative electrode 19 is $I_Y$ and that through each positive electrode 17 is $(I_Y+I_N)$. This is shown diagrammatically in FIG. 3, in which three of the electrodes of one group are shown. The polarising voltage can be arranged so that the saturation value of the current flowing in the collector electrode 18 is $(I_N+I_Y)-I_Y$, which is $I_N$, taking the downward direction of current flow (as seen in FIG. 3) as positive. Thus the magnitude of the current in the collector 18 provides a measure of the neutron flux and is automatically compensated for the effects of gamma-radiation between the three electrodes. This compensation may be made complete, or any desired degree of partial compensation may be obtained. Similarly the effect of gamma-radiation can itself be measured in terms of the current in the negative electrode 19. Since the groups of electrodes are connected electrically in parallel with each other, the currents passing through the conductors 28B and cables 29B are each equal to the sum of the currents flowing in all the collector electrodes. The signal current in each cable 29B operates the indicating equipment through the amplified previously mentioned.

The guard ring electrodes 25, being earthed, are provided in order substantially to eliminate distortion (or "edge effect") of the electric field around the edges of the collector electrodes 18, and to minimize leakage currents.

In some cases it may not be desired to provide compensation for the effects of gamma-radiation. In such cases all the polarising electrodes 17, 19 are connected to the negative pole of the voltage source, so that there are only negative and no positive polarising electrodes, the positive pole of the voltage source then being connected to a suitable point such as the vessel 11. Both sides of each collector electrode 18 are coated in this case with neutron absorbing material: both plates 23 and 24 of the collector then act as a positive electrode to two negative electrodes. Guard ring electrodes 25 are still included so as again substantially to eliminate edge effects and leakage currents.

In the ionisation chamber shown in FIG. 1, either plate 24 or plate 23 of the collector electrode 18 may be coated with fissile or neutron-sensitive material. in the latter case (with reference to FIG. 3) the current $I_N$ will flow between the negative electrode 19 and the collector electrode, and the current in the conductor 28 will therefore flow in the opposite direction to that shown in FIG. 3. The coating may be of boron when the chamber is operating as a gamma compensated ion chamber, i.e. a chamber giving an output dependent only on the neutron flux, and thus compensated for the effects of gamma-radiation: or of any suitable fissile material, for example isotopes of uranium such as $U^{235}$ or a mixture of $U^{235}$ and $U^{238}$ or $U^{233}$.

Although alumina is one suitable insulator for use in the collector electrode 18, any hard material may be used that is suitable for use as an insulator under the thermal and chemical conditions obtaining when the chamber is operating in the reactor, provided the material used absorbs neutrons at a negligible rate. The insulation may be, for example, of ceramic containing 99.5% alumina, or beryllia of high purity.

There may be any convenient number of electrode groups in the ionisation chamber: the more groups there are the more sensitive will the device be. The gas with which the chamber is filled may be any suitable ionisable gas, for example an inert gas such as helium or argon; or hydrogen, nitrogen or xenon; or a mixture of any of these gases, provided the gas in such a mixture are chemically suitable for mixing with each other and give satisfactory saturation characteristics.

The number of pillars 13, 14, 15 need not be twelve; each set of electrodes electrically connected together may be supported on two, three or more pillars or by any other suitable means.

Ionisation chambers similar to those described herein may be used in any position and in any application where measurement of neutron flux or gamma-radiation, or both, is required: and not only in nuclear reactors. When used in a nuclear reactor having a steel pressure vessel, the ionisation chambers need not be mounted within the pressure vessel.

The electric outputs from each ionisation chamber in a nuclear reactor can be transmitted to indicating equipment as stated above; or to alarm equipment; or to equipment for operating reactivity control means such as control rods in the reactor, so as to compensate for any increase or decrease in neutron flux at a particular point or to shut down the reactor.

Examples of suitable materials for the vessel and electrodes of the ionisation chamber include chemically pure vanadium and titanium respectively. If the chamber is to be used at relatively low temperatures, aluminum can be used for both the vessel 11 and the electrodes.

What I claim as my invention and desire to secure by Letters Patent is:

1. In an ionisation chamber comprising an enclosed vessel, a plurality of polarising plate electrodes arranged parallel to and alternately with a plurality of collector plate electrodes connected electrically together, a neutron-sensitive coating on one of each collector plate electrodes an ionisable gas in said vessel, means for connecting the polarising plate electrodes to a voltage source and means for collecting from the collector plate electrodes a current caused to flow therein in the presence and in response to the intensity of nuclear radiation; a co-planar electrically-conducting peripheral plate member encircling each collector plate electrode and insulating between each said peripheral plate member and the corresponding collector plate electrode.

2. An ionisation chamber according to claim 1, wherein each collector plate electrode comprises three parallel plates separated by insulation but connected electrically together, each of the two outer said plates having a said peripheral plate member associated therewith.

3. An ionisation chamber according to claim 2, wherein said insulation is alumina.

References Cited

UNITED STATES PATENTS 2,962,614  11/1960  Weill _____ 313—61

ARCHIE R. BORCHELT, *Primary Examiner.*